United States Patent
Fei et al.

(10) Patent No.: US 8,115,443 B2
(45) Date of Patent: Feb. 14, 2012

(54) PSC MOTOR WITH 4/6 POLE COMMON WINDINGS

(75) Inventors: Renyan William Fei, St. Charles, MO (US); Liang Sun, Qingdao (CN)

(73) Assignee: Nidec Motor Corporation, St. Louis, MO (US)

( * ) Notice: Subject to any disclaimer, the term of this patent is extended or adjusted under 35 U.S.C. 154(b) by 252 days.

(21) Appl. No.: 12/622,176

(22) Filed: Nov. 19, 2009

(65) Prior Publication Data

US 2010/0123427 A1     May 20, 2010

(30) Foreign Application Priority Data

Nov. 20, 2008    (CN) .................. 2008 2 0176284 U

(51) Int. Cl.
*H22K 19/12*     (2006.01)
*H02K 19/32*     (2006.01)
*H02P 1/48*     (2006.01)

(52) U.S. Cl. ........ 318/776; 318/704; 318/773; 310/179; 310/184

(58) Field of Classification Search .................. 318/772, 318/774, 773, 776, 794, 704; 310/179, 180, 310/184, 198, 191, 209
See application file for complete search history.

(56) References Cited

U.S. PATENT DOCUMENTS

| | | | | |
|---|---|---|---|---|
| 3,619,730 A * | 11/1971 | Broadway et al. | ............ | 318/776 |
| 4,127,787 A * | 11/1978 | Auinger | ........................ | 310/184 |
| 4,284,919 A * | 8/1981 | Auinger | ........................ | 310/198 |
| 4,322,665 A * | 3/1982 | Landgraf | ........................ | 318/774 |
| 5,514,943 A * | 5/1996 | Shapess | ........................ | 318/772 |
| 5,825,111 A * | 10/1998 | Fei | ................. | 310/179 |
| 6,175,208 B1 * | 1/2001 | Rose | ............................. | 318/751 |
| 6,175,209 B1 * | 1/2001 | Fei | ................. | 318/776 |
| 6,255,755 B1 * | 7/2001 | Fei | ............................. | 310/184 |
| 6,271,639 B1 * | 8/2001 | Fei | ................. | 318/524 |
| 6,445,101 B2 * | 9/2002 | Ley | ................. | 310/184 |
| 6,707,214 B1 | 3/2004 | Fei | | |
| 6,815,926 B2 * | 11/2004 | Fei et al. | ........................ | 318/773 |
| 7,196,490 B2 * | 3/2007 | Kim et al. | ........................ | 318/751 |
| 7,746,025 B2 * | 6/2010 | Choi et al. | ........................ | 318/772 |
| 2004/0041490 A1 * | 3/2004 | Fei | ................. | 310/184 |
| 2011/0109258 A1 * | 5/2011 | Fei et al. | ........................ | 318/775 |

FOREIGN PATENT DOCUMENTS

CN      1479434      3/2004

\* cited by examiner

*Primary Examiner* — Eduardo Colon Santana

(74) *Attorney, Agent, or Firm* — Maginot, Moore & Beck, LLP

(57) ABSTRACT

A PSC motor includes a stator core, a rotor arranged in a rotation relationship with respect to the stator core, a first to eighth winding coil sets wound around the stator core and a capacitor. The motor has two kinds of configurations for 4-pole and 6-pole operation modes, respectively. Both configurations comprise a primary winding and a secondary winding which is connected in series with the capacitor, and have two reversible operation directions. The configurations operate different sets of winding coils when operating in different directions.

15 Claims, 5 Drawing Sheets

Figure 2:
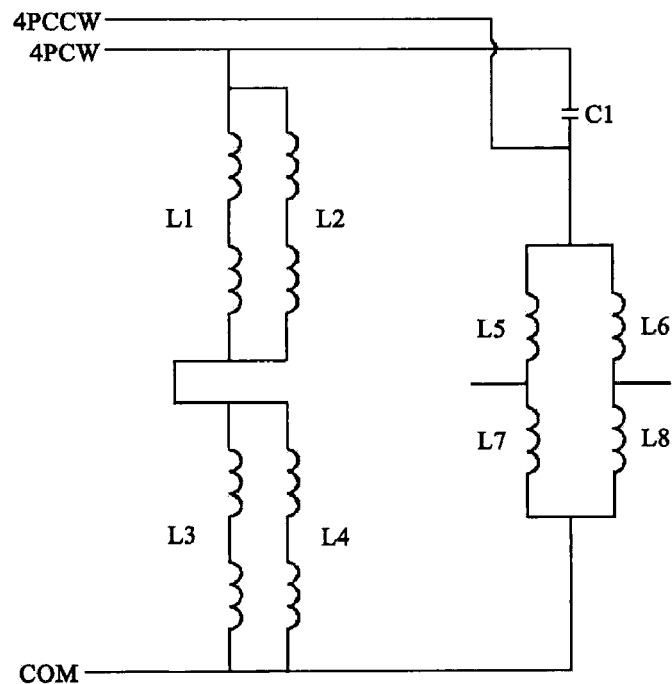
Figure 2:
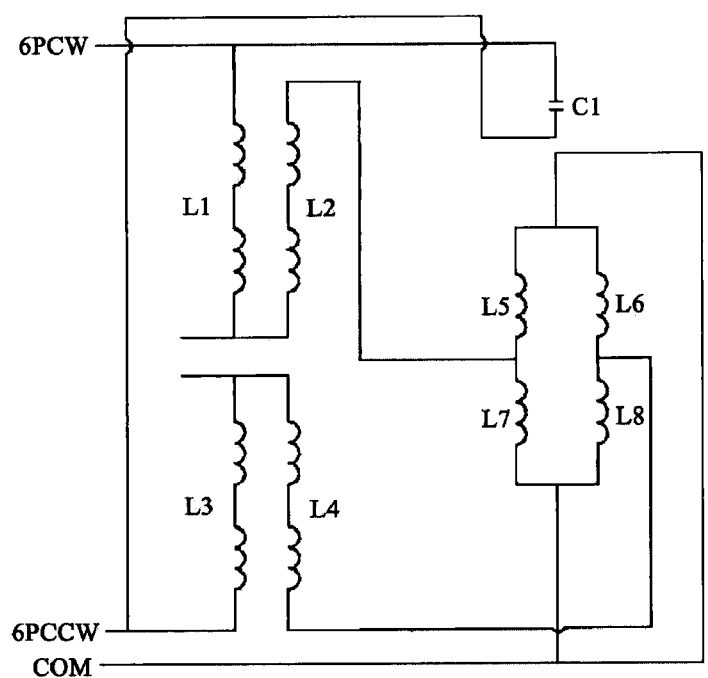

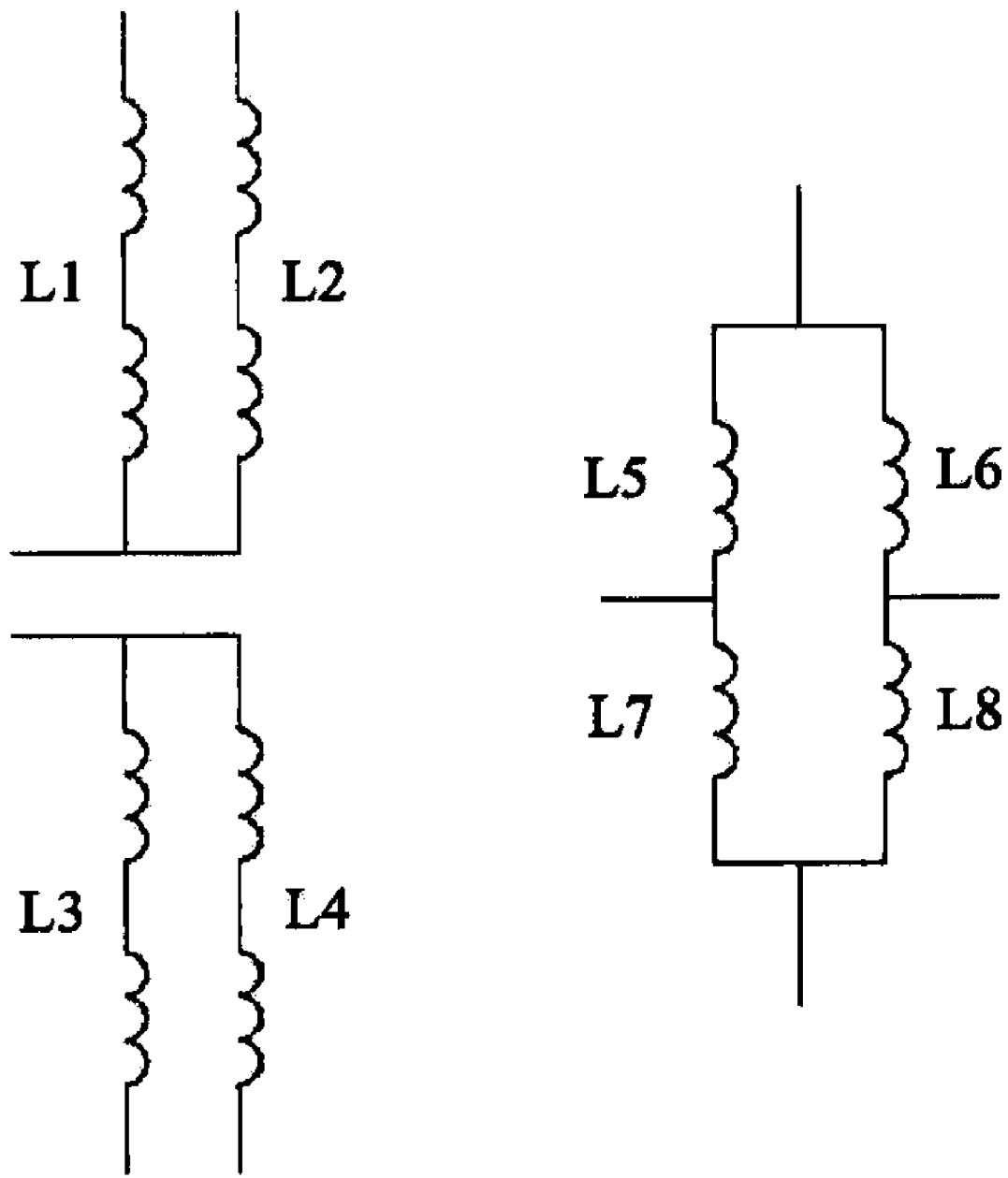
Fig. 2 ( a )

PSC MOTOR WITH 4/6 POLE COMMON WINDINGS

CROSS-REFERENCE TO RELATED APPLICATIONS

This application claims the benefit of Chinese Patent Application No. 200820176284.X filed Nov. 20, 2008. The entire disclosure of the above application is hereby incorporated by reference.

FIELD

The present application generally relates to a PSC (Permanent Split Capacitor) motor, in particular, to a PSC motor with 4/6 pole common windings.

BACKGROUND

PSC motors have been widely utilized as motors for automatic washing machines. In order to provide multi-speed operation for various washing circles without a complex and expensive variable frequency speed regulator, certain type of washing machines comprise a number of completely separate stator windings for different poles which operate at each speed. For an example, in a 3-speed PSC motor instance, a stator is provided with an eight-pole winding for operation at low speed, a six-pole winding for operation at medium speed, and a four-pole winding for operation at high speed. Usually, to accommodate a large number of windings in the limited slot size, the windings are typically made of copper, which is relatively costly.

Common winding configurations have been proposed in the prior art, wherein part of the windings are shared for operation at different number of stator poles by changing the connection, thereby achieving different motor speeds (Referring to Chinese Public Specification of an Invention Patent Application CN1,479,434 A). By comparison with conventional configurations, common winding configurations have substantial advantages such as reduced motor size, improved material efficiency and decreased product costs, etc.

Figure 1:
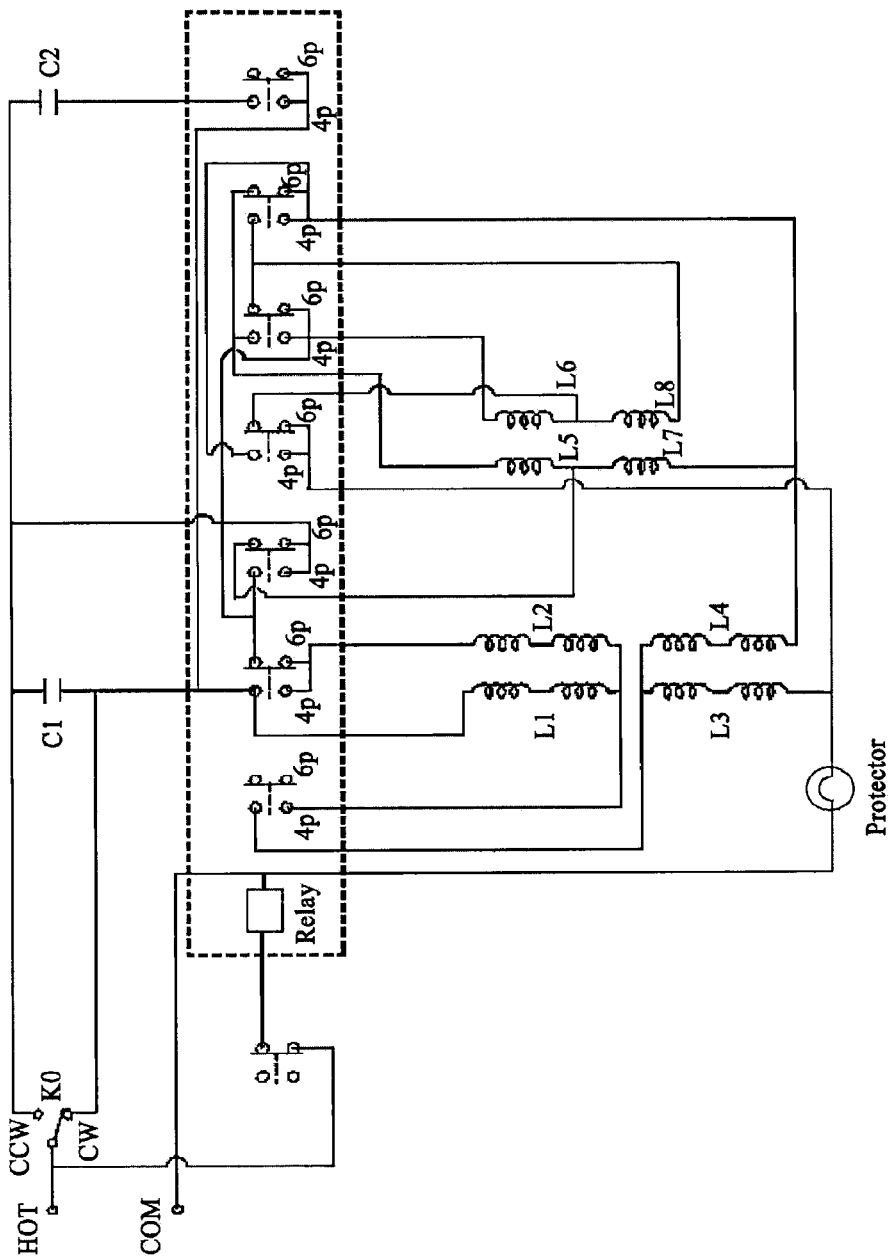

However, the feasibility of common winding techniques largely depends on whether the switch among various operation modes or reconnection of the windings is simple or not. FIG. 1 is a schematic diagram of a prior art PSC motor with 4/6 pole common windings. As can be seen from FIG. 1, five single-pole double-throw switches and one single-pole single-throw switch are necessary to switch between 4-pole and 6-pole configurations. Further, to provide improved performance by using capacitors with variable capacity at 4-pole and 6-pole operation modes, an additional single-pole single-throw switch may be provided.

Unfortunately, the prior art relays with six or more sets single-pole double-throw contacts are complex, large, and costly. Therefore, there exists room for improving the common winding configuration.

SUMMARY

The present disclosure was made to solve the above-mentioned problems. According to an aspect of the present disclosure, a PSC motor includes a stator core, a rotor arranged in a rotation relationship with respect to the stator core, a first to eighth winding coil sets wound around the stator core and a capacitor. The motor has two kinds of configurations for 4-pole and 6-pole operation modes, respectively. The configuration for the 4-pole mode comprises a primary winding and a secondary winding which is connected in series with the capacitor, and has two reversible operation directions. When operating at one direction, the primary winding includes the first to fourth winding coil sets, and the secondary winding includes the fifth to the eighth winding coil sets; and when operating at another direction, the primary winding includes the fifth to the eighth winding coil sets, and the secondary winding includes the first to fourth winding coil sets. Also, the configuration for the 6-pole mode comprises a primary winding and a secondary winding which is connected in series with the capacitor, and has two reversible operation directions. When operating at one direction, the primary winding includes the first, second, fifth and seventh winding coil sets, and the secondary winding includes the third, fourth, sixth and eighth winding coil sets; and when operating at another direction, the primary winding includes the third, fourth, sixth and eighth winding coil sets, and the secondary winding includes the first, second, fifth and seventh winding coil sets.

Preferably, the PSC motor further includes a switch assembly, which is connected with the first to eighth winding coil sets to switch selectively between the 4-pole and 6-pole configurations.

Preferably, the PSC motor further includes an additional capacitor. In the 4-pole configuration, the additional capacitor is connected in parallel to the capacitor via the switch assembly.

Preferably, the switch assembly of the PSC motor is a relay.

Preferably, the PSC motor further includes a switch which is connected between the windings of the motor and a power supply receptacle to selectively switch between the two operation directions of the 4-pole/6-pole configurations.

According to a further aspect of the present disclosure, a PSC motor includes a stator core, a rotor arranged in a rotation relationship with respect to the stator core, a first to eighth winding coil sets and an additional winding coil set wound around the stator core and a capacitor. The motor has two kinds of configurations for 4-pole and 6-pole operation modes, respectively. The configuration for the 4-pole mode comprises a primary winding and a secondary winding which is connected in series with the capacitor, and has two reversible operation directions. When operating at one direction, the primary winding includes the first to fourth winding coil sets and the additional winding coil set, and the secondary winding includes the fifth to the eighth winding coil sets; and when operating at another direction, the primary winding includes the fifth to the eighth winding coil sets, and the secondary winding includes the first to fourth winding coil sets and the additional winding coil set. Also, the configuration for 6-pole mode comprises a primary winding and a secondary winding which is connected in series with the capacitor, and has two reversible operation directions. When operating at one direction, the primary winding includes the first, second, fifth and seventh winding coil sets, and the secondary winding includes the third, fourth, sixth and eighth winding coil sets; and when operating at another direction, the primary winding includes the third, fourth, sixth and eighth winding coil sets, and the secondary winding includes the first, second, fifth and seventh winding coil sets.

Preferably, the PSC motor further includes a switch assembly, which is connected with the first to eighth winding coil sets and the additional winding coil set to switch selectively between the 4-pole and 6-pole configurations.

Preferably, the PSC motor further includes an additional capacitor. In the 4-pole configuration, the additional capacitor is connected in parallel to the capacitor via the switch assembly.

Preferably, the switch assembly of the PSC motor is a relay.

Preferably, the PSC motor further includes a switch which is connected between the windings of the motor and a power supply receptacle to switch selectively between the two operation directions of the 4-pole/6-pole configurations.

According to another aspect of the present disclosure, a PSC motor system includes any of the above described PSC motor, a power supply port which is connected to an outside power source, a switch assembly which is adapted to switch selectively between the 4-pole and 6-pole configurations of the motor, and a switch which is connected between the power supply port and the windings of the motor to switch selectively the operation directions of the 4-pole/6-pole configurations.

Preferably, the switch assembly of the PSC motor is a relay, which is separate from the motor and arranged at a control board.

DRAWINGS

Figure 3:
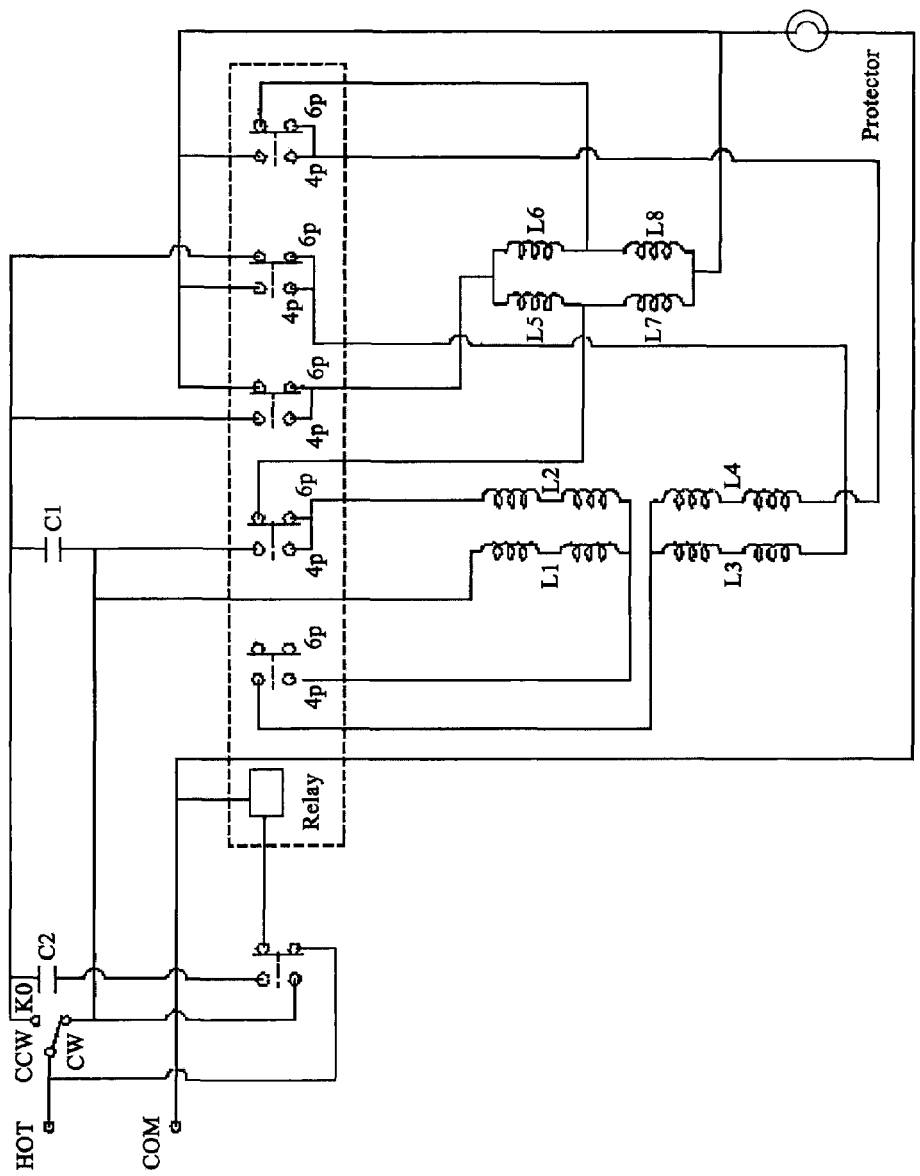
Figure 4:
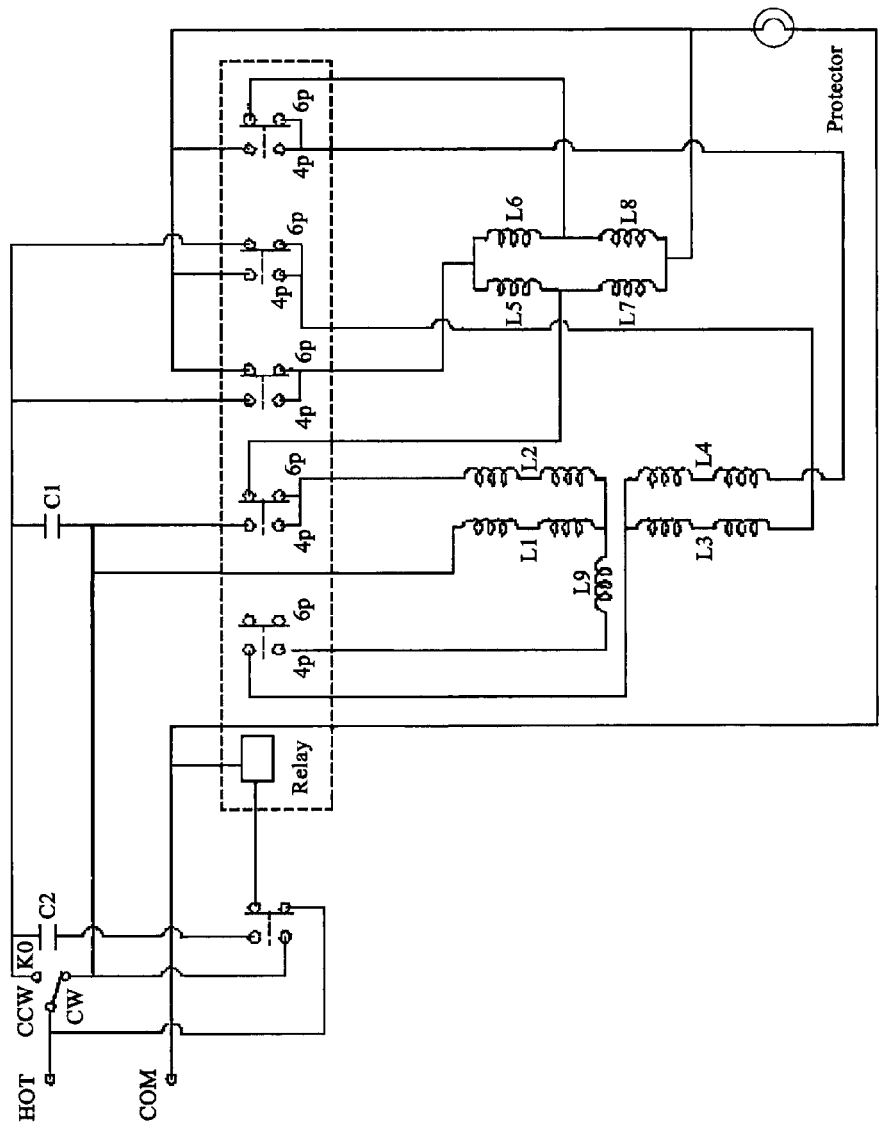

FIG. 1 is a schematic diagram of a prior art PSC motor with 4/6 pole common windings;

FIGS. 2(a)-(c) are schematic diagrams of the stator winding coil sets and the connection thereof according to the present disclosure;

FIG. 3 is a schematic diagram of a PSC motor with 4/6 pole common windings according to the embodiment of the present disclosure; and FIG. 4 is a schematic diagram of a PSC motor with 4/6 pole common windings according to a modified embodiment of the present disclosure.

DETAILED DESCRIPTION

As well known in the art, a PSC motor includes: a stator core, which is stacked with suitable magnetic material by various manufacture processes, and has a plurality of slots for receiving windings; a rotor, which is arranged in a rotation relationship with respect to the stator core; windings, which are wound around the stator core, magnetically coupling with the stator core, wherein the windings are composed of a primary winding and a secondary winding which are maintained with a 90 degree phase relationship, and the series link formed by the secondary winding and a capacitor is connected parallel to the primary winding.

Embodiments of the present disclosure will be described in connection with the drawings in which corresponding reference characters indicate corresponding parts throughout.

Firstly, referring to FIGS. 2(a)-(c), the stator winding coil sets and the connection thereof are illustrated according to the present disclosure. As can be seen from FIG. 2(a), the stator windings comprise a first to eighth winding coil sets L1-L8. For convenience, each of the first to eighth winding coil sets L1-L8 is shown as one (or two) winding coil set(s). However, each winding coil set may comprise a plurality of coil sections. Each coil section may be made of a number of turns of wire.

FIG. 2(b) shows the connection corresponding to the 4-pole configuration of the winding coil sets, wherein the series link formed by the secondary winding and the capacitor C1 is connected parallel to the primary winding. The 4-pole configuration has two reversible operation directions. When operating at a direction ("CW" direction), the primary winding includes the first to fourth winding coil sets L1-L4, and the secondary winding includes the fifth to eighth winding coil sets L5-L8. In other words, the parallel link of the first winding coil set L1 and the second winding coil set L2 is connected in series with the parallel link of the third winding coil set L3 and the fourth winding coil set L4 to form the primary winding, and the series link of the fifth winding coil set L5 and the seventh winding coil set L7 is connected in parallel with the series link of the sixth winding coil set L6 and the eighth winding coil set L8 to form the secondary winding. When operating at another direction ("CCW" direction), the primary winding includes the fifth to eighth winding coil sets L5-L8, the secondary winding includes the first to fourth winding coil sets L1-L4. That is, the series link of the fifth winding coil set L5 and the seventh winding coil set L7 is connected in parallel with the series link of the sixth winding coil set L6 and the eighth winding coil set L8 to form the primary winding, and the parallel link of the first winding coil set L1 and the second winding coil set L2 is connected in series with the parallel link of the third winding coil set L3 and the fourth winding coil set L4 to form the secondary winding.

FIG. 2(c) shows the connection of the winding coil sets corresponding to the 6-pole configuration. Also, the series link formed by the secondary winding and the capacitor C1 is connected parallel to the primary winding. The 6-pole configuration has two reversible operation directions as well. When operating at a direction ("CW" direction), the primary winding includes the first, second, fifth and seventh winding coil sets L1, L2, L5 and L7, and the secondary winding includes the third, fourth, sixth and eighth winding coil sets L3, L4, L6 and L8. In other words, the first winding coil set L1, the second winding coil sets L2 and the parallel link of the fifth winding coil set L5 and the seventh winding coil set L7 are connected in series to form the primary winding, and the third winding coil set L3, the fourth winding coil sets L4 and the parallel link of the sixth winding coil set L6 and the eighth winding coil set L8 are connected in series to form the secondary winding. When operating at another direction ("CCW" direction), the primary winding includes the third, fourth, sixth and eighth winding coil sets L3, L4, L6 and L8, and the secondary winding includes the first, second, fifth and seventh winding coil sets L1, L2, L5 and L7. That is, the third winding coil set L3, the fourth winding coil sets L4 and the parallel link of the sixth winding coil set L6 and the eighth winding coil set L8 are connected in series to form the primary winding, and the first winding coil set L1, the second winding coil sets L2 and the parallel link of the fifth winding coil set L5 and the seventh winding coil set L7 are connected in series to form the secondary winding.

Switching between 4-pole and 6-pole configurations is carried out by means of a switch assembly. A plurality of switches in the switch assembly are connected with the winding coil sets of the motor to control the connection thereof in the 4-pole/6-pole configurations. FIG. 3 is a schematic diagram of a PSC motor with 4/6 pole common windings according to the embodiment of the present disclosure, which shows the connection relationship between the switch assembly and the winding coil sets. Although the switch assembly is shown in FIG. 3 as a relay which includes a plurality of sets of contacts according to the embodiment, it can be embodied in other manners, such as a timer, a electronic switch, or a portion of an integrated assembly.

The relay shown in FIG. 3 includes five switches, which have a "4p" position and a "6p" position, respectively. When the switches are placed at the "4p" position, the 4-pole configuration is formed; otherwise, the 6-pole configuration is formed. By means of the configurations of the present disclosure, the number of the lead wires of the windings can be reduced from 12 to 11, and the number of the switches required in the relay may be reduced from 7 to 5, which may decrease the production costs.

An additional switch K0 with two positions, i.e. "CW" and "CCW", is shown in FIG. 3. The switch K0 serves to provide two reversible operation directions for the 4-pole and 6-pole operation modes. When the switch K0 is kept at one position, the 4-pole and 6-pole operation modes have the same operation direction. Thus, it is possible to operate the low speed operation mode and the high low speed operation mode without changing the operation direction, resulting in a simpler control.

FIG. 4 is a schematic diagram of a PSC motor with 4/6 pole common windings according to an modified embodiment of the present disclosure, which differs from the motor in the above embodiment in that the 4-pole configuration further includes an additional winding coil set L9. The winding coil set L9 is energized in the 4-pole configuration, but not energized in the 6-pole configuration. With such an arrangement, the air-gap flux density of the 4-pole configuration can be set by changing the number of turns of the additional winding coil set L9, without affecting the air-gap flux density of the 6-pole configuration. Therefore, either the air-gap flux density of the 4-pole or of the 6-pole configuration can be independently chosen.

As various changes could be made in the above constructions without departing from the scope of the present utility mode, it is intended that all matter contained in the above description or shown in the accompanying drawings shall be interpreted as illustrative and not in a limiting sense. For example, the switch assembly may be installed inside the motor (e.g. at a shield of the motor), or at a control board separate from the motor.

What is claimed is:

1. A PSC motor includes:
a stator core;
a rotor arranged in a rotation relationship with respect to the stator core;
a first to eighth winding coil sets (L1, L2, L3, L4, L5, L6, L7, L8) wound around the stator core; and
a capacitor (C1),
wherein the motor has two kinds of configurations for 4-pole and 6-pole operation modes, respectively,
wherein the configuration for the 4-pole mode comprises a primary winding and a secondary winding which is connected in series with the capacitor (C1), and has two reversible operation directions, when operating at one direction, the primary winding including the first to fourth winding coil sets (L1, L2, L3, L4), and the secondary winding including the fifth to the eighth winding coil sets (L5, L6, L7, L8); and when operating at another direction, the primary winding including the fifth to the eighth winding coil sets (L5, L6, L7, L8), and the secondary winding including the first to fourth winding coil sets (L1, L2, L3, L4),
and wherein the configuration for the 6-pole mode comprises a primary winding and a secondary winding which is connected in series with the capacitor (C1), and has two reversible operation directions, when operating at one direction, the primary winding including the first, second, fifth and seventh winding coil sets (L1, L2, L5, L7), and the secondary winding including the third, fourth, sixth and eighth winding coil sets (L3, L4, L6, L8); and when operating at another direction, the primary winding including the third, fourth, sixth and eighth winding coil sets (L3, L4, L6, L8), and the secondary winding including the first, second, fifth and seventh winding coil sets (L1, L2, L5, L7).

2. The PSC motor of claim 1, wherein the PSC motor further includes a switch assembly, which is connected with the first to eighth winding coil sets (L1, L2, L3, L4, L5, L6, L7, L8) to switch selectively between the 4-pole and 6-pole configurations.

3. The PSC motor of claim 2, wherein the PSC motor further includes an additional capacitor (C2) which is connected in parallel to the capacitor (C1) via the switch assembly in the 4-pole configuration.

4. The PSC motor of claim 3 wherein the switch assembly of the PSC motor is a relay.

5. The PSC motor of claim 2 wherein the switch assembly of the PSC motor is a relay.

6. The PSC motor of claim 1, wherein the PSC motor further includes a switch which is connected between the windings of the motor and a power supply receptacle to selectively switch between the two operation directions of the 4-pole/6-pole configurations.

7. A PSC motor system includes:
a PSC motor according to claim 1;
a power supply port which is connected to an outside power source;
a switch assembly which is adapted to switch selectively between the 4-pole and 6-pole configurations of the motor; and
a switch which is connected between the power supply port and the windings of the motor to switch selectively the operation directions of the 4-pole/6-pole configurations.

8. The PSC motor system of claim 7, wherein the switch assembly of the PSC motor is a relay, which is separate from the motor and arranged at a control board.

9. A PSC motor includes:
a stator core;
a rotor arranged in a rotation relationship with respect to the stator core;
a first to eighth winding coil sets (L1, L2, L3, L4, L5, L6, L7, L8) and an additional winding coil set (L9) wound around the stator core; and
a capacitor,
wherein the motor has two kinds of configurations for 4-pole and 6-pole operation modes, respectively,
wherein the configuration for the 4-pole mode comprises a primary winding and a secondary winding which is connected in series with the capacitor (C1), and has two reversible operation directions, when operating at one direction, the primary winding including the first to fourth winding coil sets (L1, L2, L3, L4) and the additional winding coil set (L9), and the secondary winding including the fifth to the eighth winding coil sets (L5, L6, L7, L8); and when operating at another direction, the primary winding including the fifth to the eighth winding coil sets (L5, L6, L7, L8), and the secondary winding includes the first to fourth winding coil sets (L1, L2, L3, L4) and the additional winding coil set (L9),
and wherein the configuration for 6-pole mode comprises a primary winding and a secondary winding which is connected in series with the capacitor (C1), and has two reversible operation directions, when operating at one direction, the primary winding including the first, second, fifth and seventh winding coil sets (L1, L2, L5, L7), and the secondary winding including the third, fourth, sixth and eighth winding coil sets (L3, L4, L6, L8); and when operating at another direction, the primary winding including the third, fourth, sixth and eighth winding coil sets (L3, L4, L6, L8), and the secondary winding including the first, second, fifth and seventh winding coil sets (L1, L2, L5, L7).

10. The PSC motor of claim 9, wherein the PSC motor further includes a switch assembly, which is connected with the first to eighth winding coil sets (L1, L2, L3, L4, L5, L6, L7, L8) and the additional winding coil set (L9) to switch selectively between the 4-pole and 6-pole configurations.

11. The PSC motor of claim 10, wherein the PSC motor further includes an additional capacitor (C2) which is connected in parallel to the capacitor (C1) via the switch assembly in the 4-pole configuration.

12. The PSC motor of claim 11 wherein the switch assembly of the PSC motor is a relay.

13. The PSC motor of claim 10 wherein the switch assembly of the PSC motor is a relay.

14. The PSC motor of claim 9, wherein the PSC motor further includes a switch which is connected between the windings of the motor and a power supply receptacle to switch selectively between the two operation directions of the 4-pole/6-pole configurations.

15. A PSC motor system includes:
a PSC motor according to claim 9;
a power supply port which is connected to an outside power source;
a switch assembly which is adapted to switch selectively between the 4-pole and 6-pole configurations of the motor; and
a switch which is connected between the power supply port and the windings of the motor to switch selectively the operation directions of the 4-pole/6-pole configurations.

* * * * *